United States Patent
Ng et al.

(10) Patent No.: US 8,134,973 B2
(45) Date of Patent: *Mar. 13, 2012

(54) MOBILE TERMINAL APPARATUS AND HAND-OFF METHOD THEREOF

(75) Inventors: Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 556 days.

This patent is subject to a terminal disclaimer.

(21) Appl. No.: 12/345,371

(22) Filed: Dec. 29, 2008

(65) Prior Publication Data

US 2009/0116451 A1    May 7, 2009

Related U.S. Application Data

(62) Division of application No. 10/561,194, filed on Dec. 16, 2005, now Pat. No. 7,843,880.

(30) Foreign Application Priority Data

Jun. 16, 2003 (JP) ................................. 2003-171295

(51) Int. Cl.
*H04W 36/00* (2009.01)
(52) U.S. Cl. ........ 370/331; 370/338; 370/328; 370/349; 455/436; 455/432.1
(58) Field of Classification Search .................. 370/331, 370/338, 328, 329, 349; 455/436, 432.1, 455/552.1
See application file for complete search history.

(56) References Cited

U.S. PATENT DOCUMENTS

| | | | |
|---|---|---|---|
| 6,215,779 B1 | 4/2001 | Bender | |
| 6,370,381 B1 | 4/2002 | Minnick | |
| 6,473,413 B1 | 10/2002 | Chiou | |
| 6,487,605 B1 | 11/2002 | Leung | |
| 6,515,974 B1 | 2/2003 | Inoue | |
| 6,535,493 B1 * | 3/2003 | Lee et al. | 370/329 |
| 6,621,810 B1 | 9/2003 | Leung | |

(Continued)

FOREIGN PATENT DOCUMENTS

JP    11-205372    7/1999

(Continued)

OTHER PUBLICATIONS

PCT International Search Report dated Nov. 22, 2004.

(Continued)

*Primary Examiner* — Ricky Ngo
*Assistant Examiner* — Rasheed Gidado
(74) *Attorney, Agent, or Firm* — Dickinson Wright PLLC

(57) ABSTRACT

A mobile terminal that ensures smooth, continuous communications sessions even when in transit, regardless of base station capabilities and functionalities, in a packet-switched data communications network. With this terminal, each of a plurality of lower interfaces 101-1 to 101-M, when its associated access mechanism is in an active state, can obtain a connection to packet-switched data communications network 150 using its home-address HoA.1 or its care-of-address CoA.BS1. When lower interface 101-a loses its connection obtained using the care-of-address CoA.BS1, multiple access decision unit 104 instructs mobility support unit 102 to set up a binding of the home-address HoA.1 and either one of the home-address HoA.2 and the care-of-address CoA.BS2 of another lower interface 101-b. Mobility support unit 102 sets up the binding according to the instruction from multiple access decision unit 104.

2 Claims, 11 Drawing Sheets

U.S. PATENT DOCUMENTS

| | | | |
|---|---|---|---|
| 7,031,709 B2 * | 4/2006 | Watanabe et al. | 455/436 |
| 7,349,364 B2 * | 3/2008 | Omae et al. | 370/328 |
| 2002/0001290 A1 | 1/2002 | Bender | |
| 2002/0012327 A1 * | 1/2002 | Okada | 370/328 |
| 2002/0045450 A1 | 4/2002 | Shimizu | |
| 2002/0194385 A1 | 12/2002 | Linder | |
| 2003/0016655 A1 | 1/2003 | Gwon | |
| 2003/0076845 A1 | 4/2003 | Yokota | |
| 2003/0193952 A1 | 10/2003 | O'Neill | |
| 2003/0235176 A1 | 12/2003 | Zhang | |
| 2004/0023653 A1 | 2/2004 | O'Neill | |
| 2004/0114558 A1 * | 6/2004 | Krishnamurthi et al. | 370/338 |
| 2004/0122976 A1 * | 6/2004 | Dutta et al. | 709/245 |
| 2004/0246939 A1 * | 12/2004 | Koskiahde et al. | 370/351 |
| 2005/0286469 A1 * | 12/2005 | Yang et al. | 370/331 |

FOREIGN PATENT DOCUMENTS

| | | |
|---|---|---|
| JP | 2002-125254 | 4/2002 |
| JP | 2003-134140 | 5/2003 |
| WO | 02/103978 | 12/2002 |

OTHER PUBLICATIONS

Japanese Office Action dated Apr. 25, 2006 w/ English translation.

R. Zheng, et al., "A Case for Mobility Support with Temporary Home Agents," Oct. 15-17, 2001; Computer Communications and Networks, 2001 Proceedings, Tenth International Conference; pp. 226-233.

Y. Chen, et al., "Dynamic Home Agent Reassignment in Mobile IP," Mar. 17-21, 2002; Wireless Communications and Networking Conference, 2002. WCNC2002.2002 IEEE; vol. 1; pp. 44-48.

* cited by examiner

MOBILE TERMINAL APPARATUS AND HAND-OFF METHOD THEREOF

This is a divisional application of application Ser. No. 10/561,194 filed Dec. 16, 2005, which is a national phase under 35 USC 371 of PCT/JP2004/008796 filed Jun. 16, 2004, which is based on Japanese application number 2003-171295 filed Jun. 16, 2003, the entire contents of each of which are incorporated by reference herein.

TECHNICAL FIELD

The present invention relates to a mobile terminal apparatus and a handoff method thereof, and in particular to a mobile terminal apparatus which has a plurality of access mechanisms to a packet-switched data communications network and constantly changes its point of attachment to the packet-switched data communications network.

BACKGROUND ART

With the emergence and proliferation of wireless technology, the Internet today has evolved to a stage where numerous data communications end-points are made up of mobile terminals, each roaming through different domains and attaching itself to different points of attachment to a packet-switched data communications network (such as, the Internet) at different points in time. Such roaming provisioning is fairly matured in a circuit-switched communications network, such as the phone system. In a packet-switched communications network, however, supporting such roaming capabilities is difficult. This is because mobile terminals in a packet-switched communications network are reached using unique addresses, and such addresses usually contain portions (usually the prefix) that must be valid in a spatial topology. Also, it is desirable for mobile terminals to continue being reached at the same address after a plurality of change of point of attachment to the packet-switched data communications network. This allows seamless continuation of sessions (such as file transfer) across different points of attachment to the packet-switched data communications network.

To support such roaming capabilities, the industry has developed solutions for mobility support in Internet Protocol version 6 (IPv6). In mobile IP, each mobile node (i.e. mobile terminal) has a permanent home domain (i.e. a home network). When the mobile node is attached to its home network, it is assigned a permanent global address, known as a home-address. When the mobile node is away (that is, attached to some other foreign networks), it is usually assigned a temporary global address, known as a care-of-address. The idea of mobility support is that the mobile node can be reached at the home-address even when the mobile node is attached to other foreign networks, so that other nodes in the packet-switched data communications network need only identify the mobile node by the mobile node's home-address. Mobile nodes register their care-of-addresses with home agents using messages known as Binding Updates. The home agent is responsible for intercepting messages that are addressed to the mobile node's home-address, and forwarding the packet to the mobile node's care-of-address using IP-in-IP tunneling. IP-in-IP tunneling involves encapsulating an original IP packet in another IP packet. Such a binding between home-addresses and care-of-addresses, made known at the home agent of the mobile node, allows the mobile node to be reached no matter where the mobile node is. However, there exist a time when the mobile node has left a previous point of attachment and yet to set up a new binding between its home-address and new care-of-address (or even have not yet received a new care-of-address). During this time, no packet can be delivered to the mobile node.

In a conventional art, a method is disclosed to allow fast handoff between two base stations (see, for example, U.S. Pat. No. 6,473,413 B1 (October 2002)). In the disclosed method, when a mobile node roams to a new network, it issues a reassociation request to a base station A. In response to the reassociation request, the base station A finds the IP address of another base station B via a communications mechanism of mobile IP of IP layer, and then sends a handoff request frame to the base station B. In turn, upon receiving the handoff request, the base station B deletes the record of the mobile node in an association table, and then sends an handoff response frame back to the base station A via the communications mechanism of mobile IP. Then, a unicast handoff response frame will be forwarded to the base station A, and consequently the base station A can complete the handoff procedures.

In the above-described conventional method, however, the fast handoff requires base stations to actively participate, adding burden to the base stations' processing loads. Furthermore, the fast handoff procedures depend on the base stations capabilities (or offered functionalities). This makes the deployment of such method more complex, and often more expensive.

Existing solutions such as the above-described conventional method for supporting mobility in a packet-switched data communications network is inadequate in ensuring that a mobile terminal has a smooth, continuous communications session when in transit, because, although the method enables fast handoff between base stations, it still requires additions to base station functionalities. Not only does this increase the processing burden of the base station, it also requires special efforts to ensure compatibility between base stations from different vendors and service providers.

It is an object of the present invention to provide a mobile terminal apparatus and handoff method thereof which are capable of achieving smooth, continuous communications sessions even when in transit, regardless of base station capabilities and functionalities, in a packet-switched data communications network.

A mobile terminal apparatus according to one aspect of the present invention has: a plurality of interfaces each of which is capable of, when its associated access mechanism is in an active state, obtaining a connection to a network using either one of its home-address which is assigned in advance and its care-of-address which is assigned during its presence in a domain where its home-address is not available; an instructing section that instructs a setup of a binding of a home-address of a first interface, which loses a connection obtained using a care-of-address of said first interface, of said plurality of interfaces, and either one of a home-address and a care-of-address of a second interface of said plurality of interfaces, and a setup section that sets up said binding.

A handoff method according to another aspect of the present invention in a mobile terminal apparatus having a plurality of interfaces each of which is capable of, when its associated access mechanism is in an active state, obtaining a connection to a network using either one of its home-address which is assigned in advance and its care-of-address which is assigned during its presence in a domain where its home-address is not available, includes: an instructing step for instructing a setup of a binding of a home-address of a first interface, which loses a connection obtained using a care-of-address of said first interface, of said plurality of interfaces, and either one of a home-address and a care-of-address of a second interface of said plurality of interfaces; and a setup step for setting up said binding.

BEST MODE FOR CARRYING OUT THE INVENTION

Figure 1:
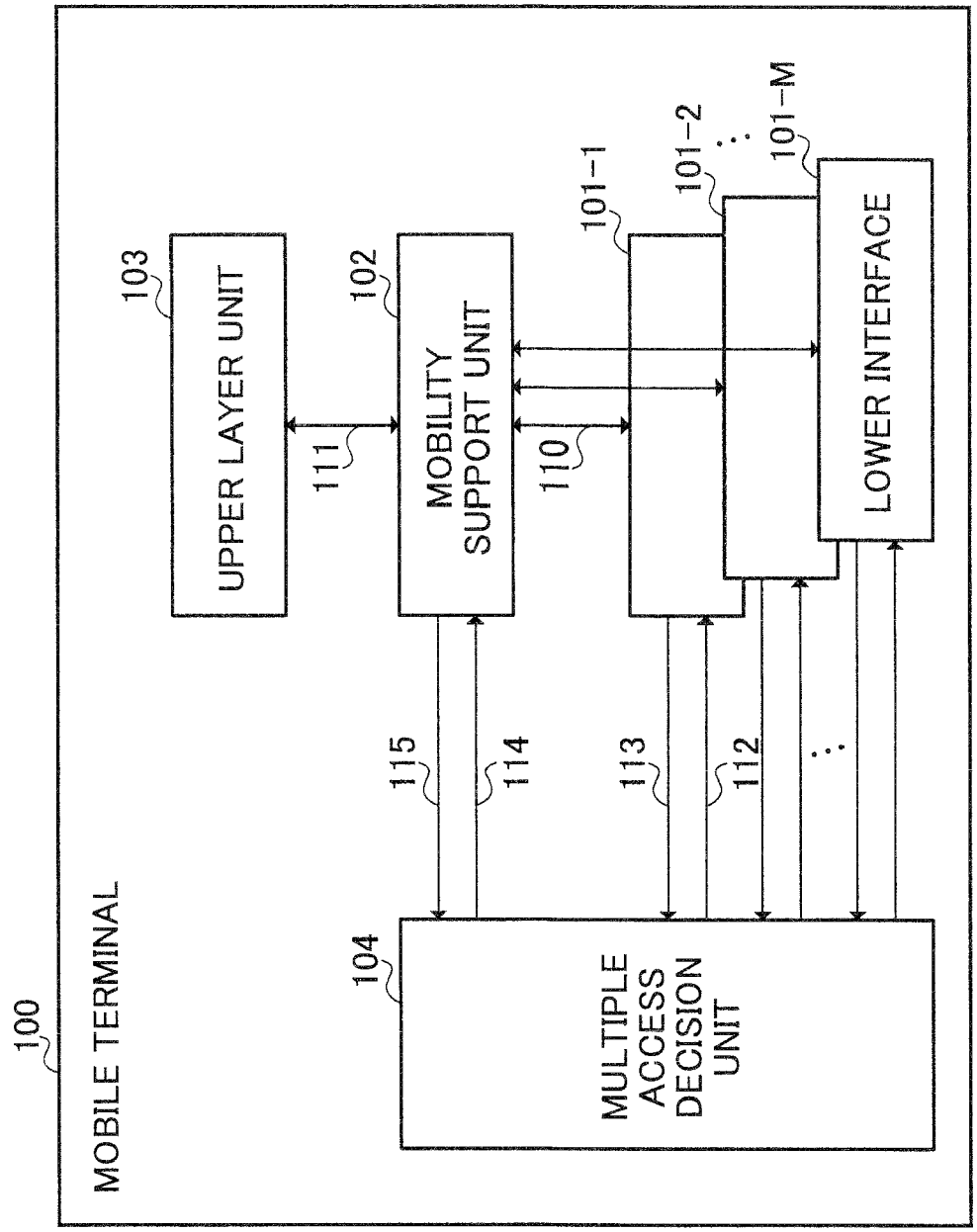
FIG. 1 is a block diagram showing the architecture of a mobile terminal according to Embodiment 1 of the present invention.

The essence of the present invention is to instruct a setup of a binding of a home-address of a first interface, which loses a connection obtained through its care-of-address, of a plurality of interfaces each of which is capable of, when its associated access mechanism is in an active state, obtaining an access to a network using one of its home-address which is assigned in advance and its care-of-address which is assigned during its presence in a domain where its home-address is not available, and one of a home-address and a care-of-address of a second interface of the plurality of interfaces, and to set up the binding.

A method for achieving seamless handoff in a mobile terminal roaming in a packet-switched data communications network is disclosed in this document. To help understand the disclosed invention, the following definitions are used:

(a) A "packet" is a self-contained unit of data of any possible format that could be delivered on a data network. A "packet" normally consists of two portions: a "header" portion and a "payload" portion. The "payload" portion contains data that are to be delivered, and the "header" portion contains information to aid the delivery of the packet. A "header" must have a source address and a destination address to respectively identify the sender and recipient of the "packet."

(b) A "packet tunneling" refers to a self-contained packet being encapsulated into another packet. The act of "packet tunneling" is also referred to as "encapsulation" of packets.

The packet that is being encapsulated is referred to as the "tunneled packet" or "inner packet." The packet that encapsulates the "inner packet" is referred to as the "tunneling packet" or "outer packet." Here, the entire "inner packet" forms the payload portion of the "outer packet."

(c) A "mobile node" is a network element that changes its point of attachment to the packet-switched data communications network. It is used to refer to an end-user communications terminal that can change its point of attachment to the packet-switched data communications network. In this specification, the terms "mobile node" and "mobile terminal" will be used interchangeably unless explicitly stated otherwise.

(d) A "home-address" is a primary global address assigned to a mobile terminal that can be used to reach the mobile terminal regardless of where on the packet-switched data communications network the mobile terminal is currently attached to.

(e) A mobile terminal that is attached to the packet-switched data communications network where its home-address is topologically compatible with the addresses used in the vicinity of the point of attachment is referred to as "at home." The vicinity of this point of attachment that is controlled by a single administrative authority is referred to as the "home domain" of the mobile terminal.

(f) A mobile terminal that is attached to the packet-switched data communications network at a point where the home-address of the said mobile terminal is topologically incompatible with the addresses used in the vicinity of that point of attachment is referred to as being "away," and the vicinity of this point of attachment is referred to as the "foreign domain."

(g) A "care-of-address" is a temporary global address assigned to a mobile terminal that is away such that the assigned "care-of-address" is topologically compatible with the addresses used in the vicinity of the mobile node's point of attachment to the packet-switched data communications network.

(h) A "home agent" is a network entity that resides at the home domain of a mobile terminal that performs registration services of care-of-addresses of the mobile terminal when it is away, and to forward packets addressed to the home-address of the mobile terminal to the care-of-address of the mobile node.

(i) A "binding update" is a message sent from a mobile terminal to its home agent, or to some other nodes on the packet-switched data communications network the mobile terminal is communicating to, that informs the recipient the current care-of-address of the sender. This forms a "binding" between the care-of-address and the home-address of the mobile terminal at the recipient.

In the following description, for purpose of explanation, specific numbers, times, structures, and other parameters are set forth in order to provide a thorough understanding of the present invention. However, it will be apparent to one of ordinary skill in the art that the present invention may be practiced without these specific details.

Embodiment 1

FIG. 1 is a block diagram showing the architecture of a mobile terminal according to Embodiment 1 of the present invention. Mobile terminal 100 shown in FIG. 1 has M number (M is an integer greater than or equal to 2) of lower interfaces 101-1 to 101-M, mobility support unit (MSU) 102, upper layer unit 103, and multiple access decision unit (MADU) 104. When reference is made to any one or more of lower interfaces 101-1 to 101-M, the lower interface(s) will be hereinafter referred to as "lower interface 101."

The different access mechanisms available in the mobile terminal are abstracted into lower interfaces 101-1 to 101-M. Lower interface 101 is a collective block to refer to: physical network interface hardware; software controlling the hardware; and protocols that govern the communications through such hardware. For example, under the International Organization for Standardization's (ISO) open systems interconnection (OSI) model, lower interface 101 will include all protocols relating to the physical and data link layers. As is described previously, the present invention targets mobile terminals with multiple access mechanisms. Generally, such mobile terminals normally consist of a plurality of lower interfaces.

Note that it may be possible for a single piece of physical hardware to provide two (or more) different access mechanisms. Such configurations will still be depicted as having multiple lower interfaces 101-1 to 101-M), where each of lower interfaces 101- to 101-M encapsulates the functionalities required for each access mechanism. Lower interface 101 is said to be active if the associated access mechanism has an active link with a base station.

Similarly, the functional block upper layer unit 103 refers to all upper layer protocols and applications that transmit and receive data packets via mobility support unit 102 and lower interfaces 101. Using the ISO's OSI model as an example again, upper layer unit 103 includes the application, presentation, session, and transport layers.

MSU 102 is the core of mobile terminal 100 in its packet-switched data communications operations, as it handles the reception of packets, transmission of packets and determining the route of packets. This is equivalent to the Network layer in ISO's OSI model, or in an Internet Protocol (IP) environment, the IP layer. MSU 102 also contains the logic to handle the mobility of mobile terminal 100 with respect to the packet-switched data communications network. Specifically, MSU 102 also handles the generation or attainment of new temporary global address (i.e. care-of-address) when mobile terminal 100 attaches to a new base station, and is responsible to send binding updates to the home agent of mobile terminal 100 to register the binding between the home-address and care-of-address of mobile terminal 100.

Note that in this specification, a home-address and a care-of-address are tied to lower interface 101 instead of mobile terminal 100. This is consistent with most packet-switched data communications network, such as the Internet Protocol, where addresses are tied to the network interface instead of the network node. Such a distinction is also general in the sense that it covers cases where all lower interfaces 101-1 to 101-M of mobile terminal 100 share the same home-address. Since addresses are tied to lower interfaces 101-1 to 101-M, the concept of home domain and foreign domain also relates to lower interface 101. That is, lower interface 101 is at home if its home-address is topologically compatible with its point of attachment to the packet-switched data communications network, and lower interface 101 is in a foreign domain if its home-address is topologically incompatible with its point of attachment to the packet-switched data communications network.

MADU 104 is the core of the invention. As will be clear in descriptions later, MADU 104 is responsible to dynamically modify the bindings between care-of-addresses and home-addresses of mobile terminal 100 and to make decision to activate or deactivate any or all of the lower interfaces 101-1 to 101-M. Also, MADU 104 knows which lower interface 101 is associated with which type of access mechanism in advance.

Each path between lower interface 101 and MSU 102 which is assigned reference numeral 110, and the path between MSU 102 and upper layer unit 103 which is assigned reference numeral 111 are the data paths used to transfer packets from one unit to another. Each signal path used to control lower interface 101 is assigned reference numeral 112. Each signal path used to notify MADU 104 new conditions in lower interface 101 is assigned reference numeral 113. A signal path used to control MSU 102 is assigned reference numeral 114. A signal path used to notify MADU (104) of new conditions in MSU 102 is assigned reference numeral 115.

Figure 2:
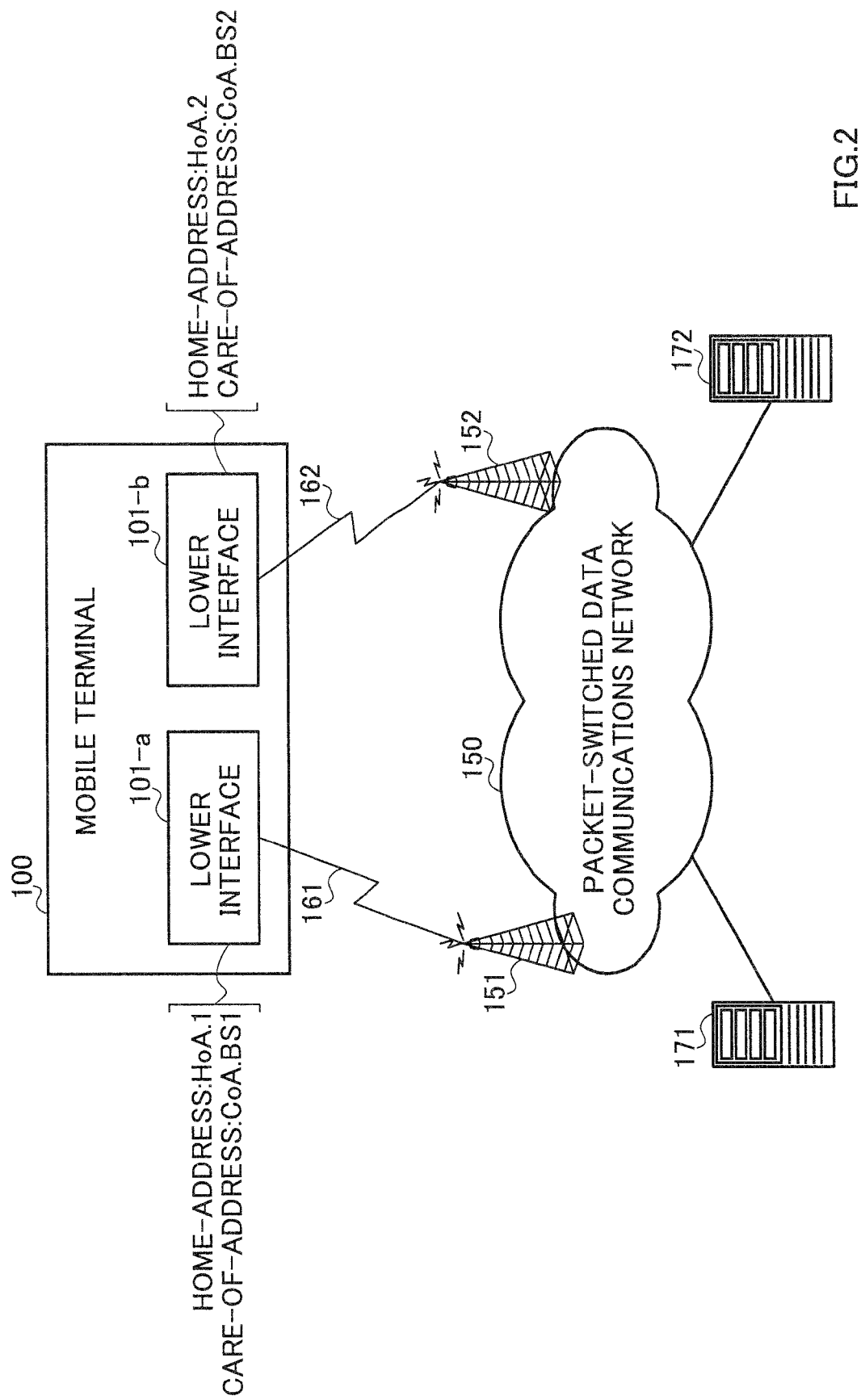
FIG. 2 is a drawing for explaining an example of operations in the entirety of the packet-switched data communications network to which the mobile terminal according to Embodiment 1 of the present invention is attached.

Under normal operations, mobile terminal 100 will have one or more lower interfaces 101 active. For each lower interface 101 that is active, mobile terminal 100 will have a care-of-address bound to a home-address. Such a binding may have already been sent to the home agent of mobile terminal 100, and any other network nodes that is communicating with mobile terminal 100. This is depicted in FIG. 2. FIG. 2 is a drawing for explaining an example of operations in the entirety of the packet-switched data communications network to which the mobile terminal according to the present embodiment is attached.

In this example, mobile terminal 100 has two points of attachment to packet-switched data communications network 150: one via base station 151 using access mechanism 161 through lower interface 101-a, and the other via base station 152 using access mechanism 162 through lower interface 101-b. The figure assumes that lower interface 101-a has a permanent global address (i.e. home-address) of HoA.1 with associated home agent 171. The care-of-address assigned to lower interface 101-a is CoA.BS1, which is topologically valid in the domain of base station 151. In addition, lower interface 101-b has a permanent home-address of HoA.2 with associated home agent 172. The care-of-address assigned to lower interface 101-b is CoA.BS2, which is topologically valid in the domain of base station 152.

With these associations, a packet sent to mobile terminal 100 at the address HoA.1 would be intercepted by the home agent 171. Home agent 171 would then forward this packet to the care-of-address CoA.BS1 using packet tunneling. Since an outer packet is addressed to CoA.BS1, the above packet will be routed to mobile terminal 100 via base station 151. Similarly, a packet sent to mobile terminal 100 at the address HoA.2 would be intercepted by the home agent 172. Home agent 172 would then forward this packet to the care-of-address CoA.BS2 using packet tunneling. Since the outer packet is addressed to CoA.BS2, it will be routed to the mobile terminal 100 via base station 152.

Note that in FIG. 2 (and the above descriptions), two home agents are illustrated for generality. It should be obvious to one of ordinary skill in the art that the concept can be extended to any number of lower interfaces and any number of home agents, where the two numbers are independent. In fact, for the illustrations in FIG. 2, home agent 171 and home agent 172 can be the same entity.

It should also be noted that home agents are not the only entities that can receive binding updates. The bindings between home-addresses and care-of-addresses can also be made known to other network nodes that communicate with the mobile terminal. For instance, in mobile IPv6, mobile nodes can perform so-called route optimization with the nodes with which the mobile nodes are communicating (called "corresponding nodes"). In route optimization, the mobile nodes send binding updates to the corresponding nodes so that the corresponding nodes can insert special indications in packets to forward the packets to the care-of-addresses of the mobile nodes (instead of going through the home agents). It should be obvious to one of ordinary skill in the art that the disclosed invention applies equally, without any loss of functionality, to cases where the mobile terminal sends binding updates to these correspondent nodes.

As mobile terminal 100 moves, one of the access links may get out of range and thus be broken. For illustration purposes, a case will be assumed where the link between lower interface 101-*a* and base station 151 is broken. Hereinafter, a lower interface that is downed such as lower interface 101-*a* will be referred to as a downed lower interface.

Figure 3:
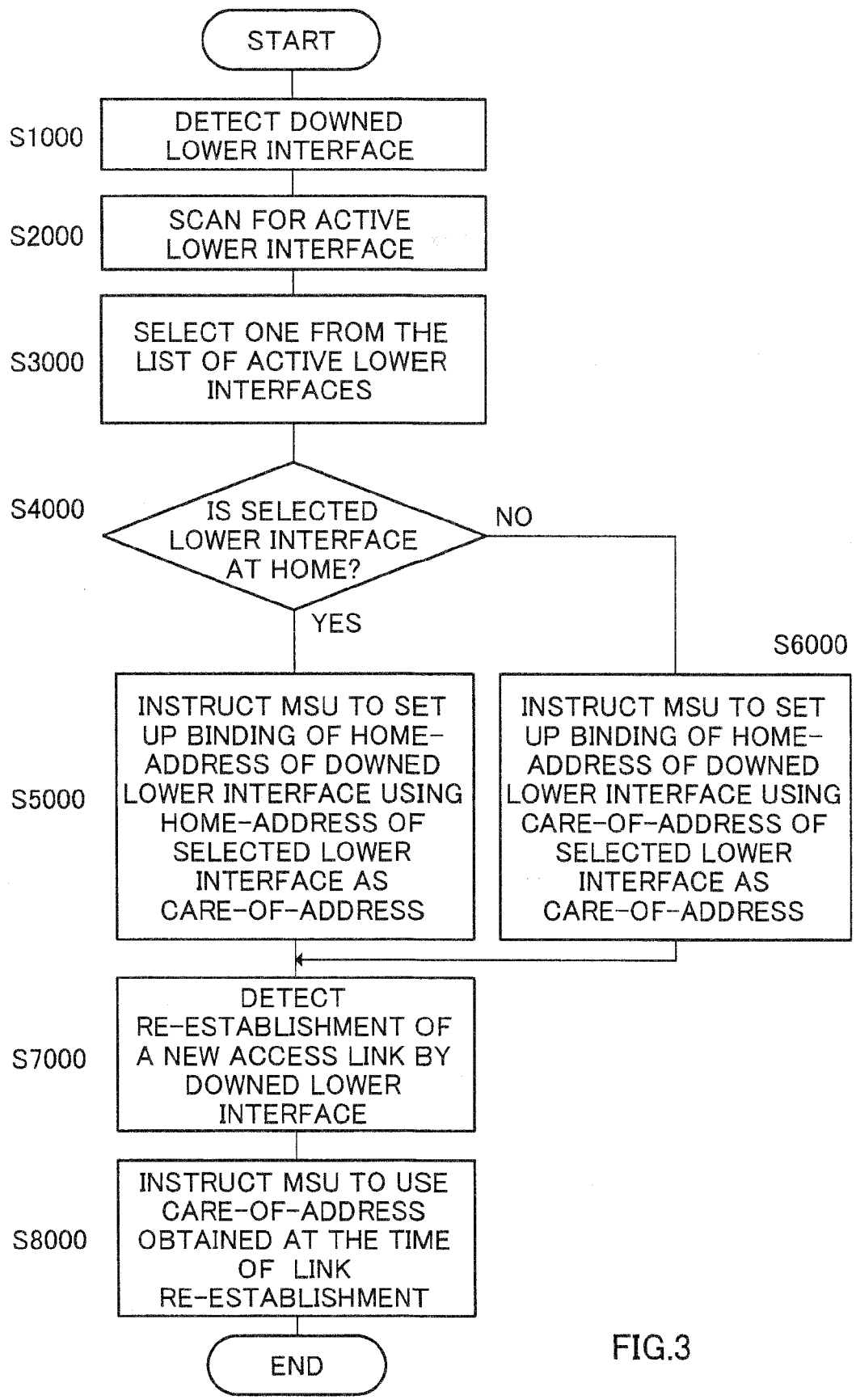
FIG. 3 is a flow chart for explaining operations of multiple access decision unit in the mobile terminal according to Embodiment 1 of the present invention.

When MADU 104 detects this from one of the signal paths 113, 115, it will attempt to reassociate the home-address HoA.1. If reassociation is not done, packets sent to mobile terminal 100 at the destination address HoA.1 will not be delivered, since the tunneling packet cannot reach mobile terminal 100 at CoA.BS1. To reassociate the home-address of the downed lower interface, that is, HoA.1, MADU 104 follows the algorithm depicted in FIG. 3. FIG. 3 is a flow chart for explaining the operations in MADU 104.

As stated above, MADU 104 detects the downed lower interface 101-*a*, in step 1000, Then in step 2000, MADU 104 first scans through lower interfaces 101-1 to 101-M to search for one or more lower interfaces 101 that are active. MADU 104 has control over M number of lower interfaces 101-1 to 101-M.

These lower interfaces 101-1 to 101-M obtain and maintain connectivity with the respective access networks independently, and generate Interface_State_Message including: Interface_State (a flag to indicate if lower interface 101 has an association with the access network); Interface_AA (a flag to indicate if the association with the access network requires authentication and/or authorization from lower interface 101 or users information are required); and AA_State (a flag to indicate if the authentication and/or authorization between lower interface 101 and the access network is performed only if authentication and/or authorization are required). An active indicator in the Interface_State field of the Interface_State_Message for lower interface 101 indicates that the interface may have successfully gone through the appropriate lower interface authentication and authorizations as required by the mobile terminal user's profile or as required by the access networks. An implementation of the Interface_State_Message is as follows:

---

Interface_State_Message {
    Interface_State; /*"1" indicate active, "0" indicate otherwise
*/
    Interface_AA; /*"1" indicate Authentication and/or
Authorization required for full lower interface to access network
association, "0" indicates Authentication and/or Authorization is not
required for full lower interface to access network association. */
    AA_State; /*"1" indicate Authentication and Authorization
process completed, "0" indicate otherwise. */
}

---

The message may be generated independently of or in response to a request from MADU. Note that the use of 0s and 1s are by no means limiting. It should be obvious to one of ordinary skill in the art that any other values can be used to represent the same meaning.

In step 3000, from the list of active lower interfaces 101, MADU 104 selects an active lower interface 101 for use. Assume the active lower interface selected here is lower interface 101-*b*. This selection can be random, or based on a certain priority. Such a priority may be established based on one of the following evaluation criteria:

(i) Cost of the access mechanism (certain access mechanism may be more expensive than others—for example, satellite link versus IEEE 802.11). Lower interface 101 that offers the cheapest access is selected;

(ii) Power consumption of the access mechanism (certain access mechanism may consume more power than others—for example, satellite link versus IEEE 802.11). Lower interface 101 that offers the lowest power consumption is selected;

(iii) Bandwidth/speed of the access mechanism. Lower interface 101 that offers the highest bit-rate or fastest access is selected;

(iv) Availability of the access mechanism. Lower interface 101 that is expected to remain active for the longest amount of time given the current movement patterns of mobile terminal 100 is selected; or (v) Weighted combination (sum) of the above criteria. Weights may be zero, positive or negative, and lower interface 101 that offers the largest sum is selected.

Once active lower interface 101-*b* is selected, MADU 104 next checks if the selected lower interface 101-*b* is in its home domain or foreign domain, in step 4000. As a result of the check, if the selected lower interface 101-*b* is at home, MADU 104 instructs MSU 102 to set up a binding of the home-address of the downed lower interface 101-*a* with the home-address of the selected lower interface 101-*b* as the care-of-address, in step 5000. On the other hand, if the selected lower interface 101-*b* is in a foreign domain, MADU 104 instructs MSU 102 to set up a binding of the home-address of the downed lower interface 101-*a* with the care-of-address of the selected lower interface 101-*b* as the care-of-address, in step 6000.

MADU 104 will need to set some internal state to reflect that the downed lower interface 101-*a* is in a state where the care-of-address is "borrowed" from another lower interface 101-*b*. In other words, after the internal state is updated, the downed lower interface is marked as having "borrowed" a care-of-address. In addition, MADU 104 will also need to remember from which lower interface 101 the downed lower interface 101-*a* "borrowed" the care-of-address.

In this case, since lower interface 101-*b* is in a foreign domain, MADU 104 will instruct MSU 102 to set up a binding between CoA.BS2 and HoA.1. This will cause packets sent to HoA.1 to be tunneled to mobile terminal 100 via access link established by access mechanism 162 between lower interface 101-*b* and base station 152.

The new address bindings will be in effect until such a time when the downed lower interface 101-*a* reestablishes access link to Base Station 151 or some other new base station.

More specifically, in step 7000, the downed lower interface 101-*a* reestablishes a new access. When this happens, MADU 104 will instruct MSU 102 to use the new care-of-address obtained from the base station (original or new) for the binding of the home-address of the downed lower interface, that is, HoA.1, in step 8000. In addition, MADU 104 will remove any state variable associated with the (previously) downed lower interface 101-*a*, so that the lower interface 101-*a* is no longer marked as having "borrowed" a care-of-address.

It is possible that before the downed lower interface 101-*a* can be reassociated to some base station, lower interface 101-*b* from which it "borrowed" its care-of-address may be downed. Thus when lower interface 101 is down, MADU 104 scans through its internal states (state variables) to see which lower interfaces 101 have "borrowed" their care-of-addresses from the downed lower interface 101. Any lower interfaces 101 that have "borrowed" are treated as going down too, and the algorithm that is described in FIG. 3 must be carried out for every one of them, including the newly downed lower interface 101.

Thus, according to the present embodiment, mobile terminal 100 and a method thereof are provided that can recover from link failure to a base station, by having access-losing interface 101-*a* temporarily borrow an address used by another interface 101-*b* associated with an active access mechanism. Therefore, mobile terminal 100 with a plurality of access mechanisms can achieve seamless handoff between base stations independently of control by base stations, as mobile terminal 100 changes its point of attachment to a packet-switched data communications network.

Embodiment 2

Figure 4:
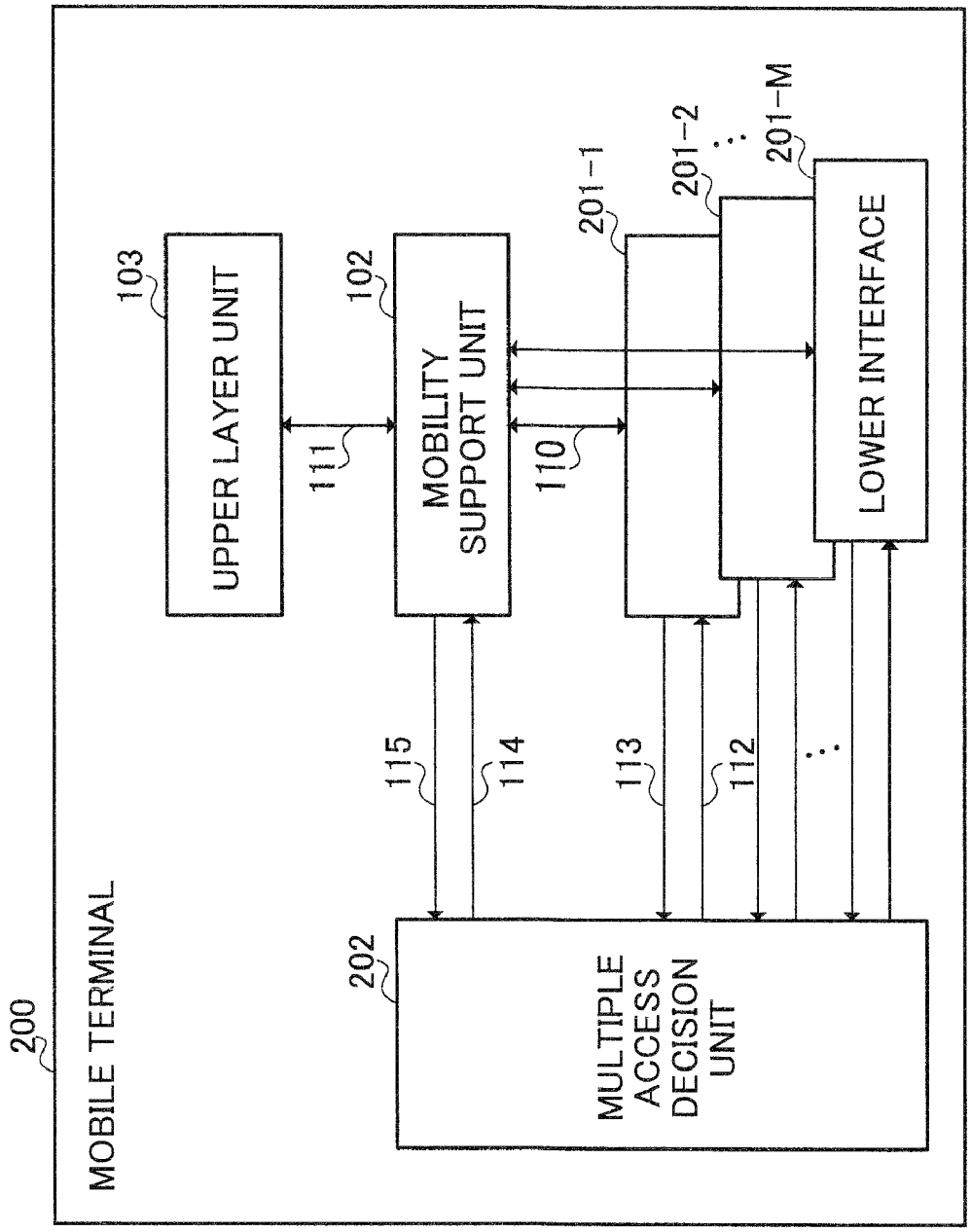
FIG. 4 is a block diagram showing the architecture of a mobile terminal according to Embodiment 2 of the present invention.

FIG. 4 is a block diagram showing the architecture of a mobile terminal according to Embodiment 2 of the present invention. Mobile terminal 200 shown in FIG. 4 has a basic architecture similar to that of the mobile terminal explained in Embodiment 1, and therefore the elements of mobile terminal 200 that are identical to those of mobile terminal 100 will be given identical reference numerals, and detailed description thereof will be omitted.

Mobile terminal 200 has M number of lower interfaces 201-1 to 201-M and MADU 202 instead of lower interfaces 101-1 to 101-M and MADU 104 of mobile terminal 100. Hereinafter, when reference is made to any one or more of lower interfaces 201-1 to 201-M, the lower interface(s) will be referred to as "lower interface 201."

As a technical feature explained in the present embodiment, in mobile terminal 200, lower interface 201 uses prediction techniques to indicate to MADU 202 that it may go down in a short period of time. Therefore, there is no need to wait for lower interface 201 to go down before kicking MADU 202 into action, as explained in Embodiment 1.

Lower interfaces 201-1 to 201-M conduct the above-described prediction, which can be based on the following methods:

(i) Measuring the power of the signal from the base station. Weaker signals suggest greater distance between the mobile terminal and the base station;
(ii) Measuring the velocity of mobile terminal 200;
(iii) Comparing the current location of mobile terminal 200 and known locations of base stations (using, for example, Global Positioning System); or
(iv) Combination of the above methods.

Then, based on a result of the prediction, lower interfaces 201-1 to 201-M generates Interface_Release_Indicator_Message including: Release_Indicator (a flag to indicate if the lower interface is ready to be fully disassociated from the access network); and Release_Time (access network disassociation time measured after the message is generated by the lower interface), as follows:

```
Interface_Release_Indicator_Message{
    Release_Indicator; /*"1" to indicate Interface is releasing
connectivity with the access network previously associated with."0"
indicate Interface is not releasing connectivity */
    Release_Time; /* Unit of time a full dissociation will occur after
the message is sent out from the lower interface */
}
```

After a successful disassociation, lower interfaces 201-1 to 201-M are responsible for updating parameter/s necessary for generating the Interface_State field of the Interface_State_Message. The Interface_State field needs to reset to "0" in response to subsequent generation of the Interface_State_Message. Note that this message may be generated independently of or in response to a request from MADU 202, and that the use of 0s and 1s by no means limiting. It should be obvious to one of ordinary skill in the art that any other values can be used to represent the same meaning.

The other features of lower interfaces 201-1 to 201-M are the same as those of lower interfaces 101-1 to 101-M explained in Embodiment 1.

When MADU 202 receives such Interface_Release_Indicator_Message via signal path 113 generated by lower interface 201, which indicates that lower interface 201 is about to be disconnected, then MADU 202 takes steps to reassociate the home-address of lower interface 201 that is sending the Interface_Release_Indicator_Message (hereafter referred to as the "hinting lower interface") in advance. The other features of MADU 202 are the same as those of MADU 104 explained in Embodiment 1.

Figure 5:
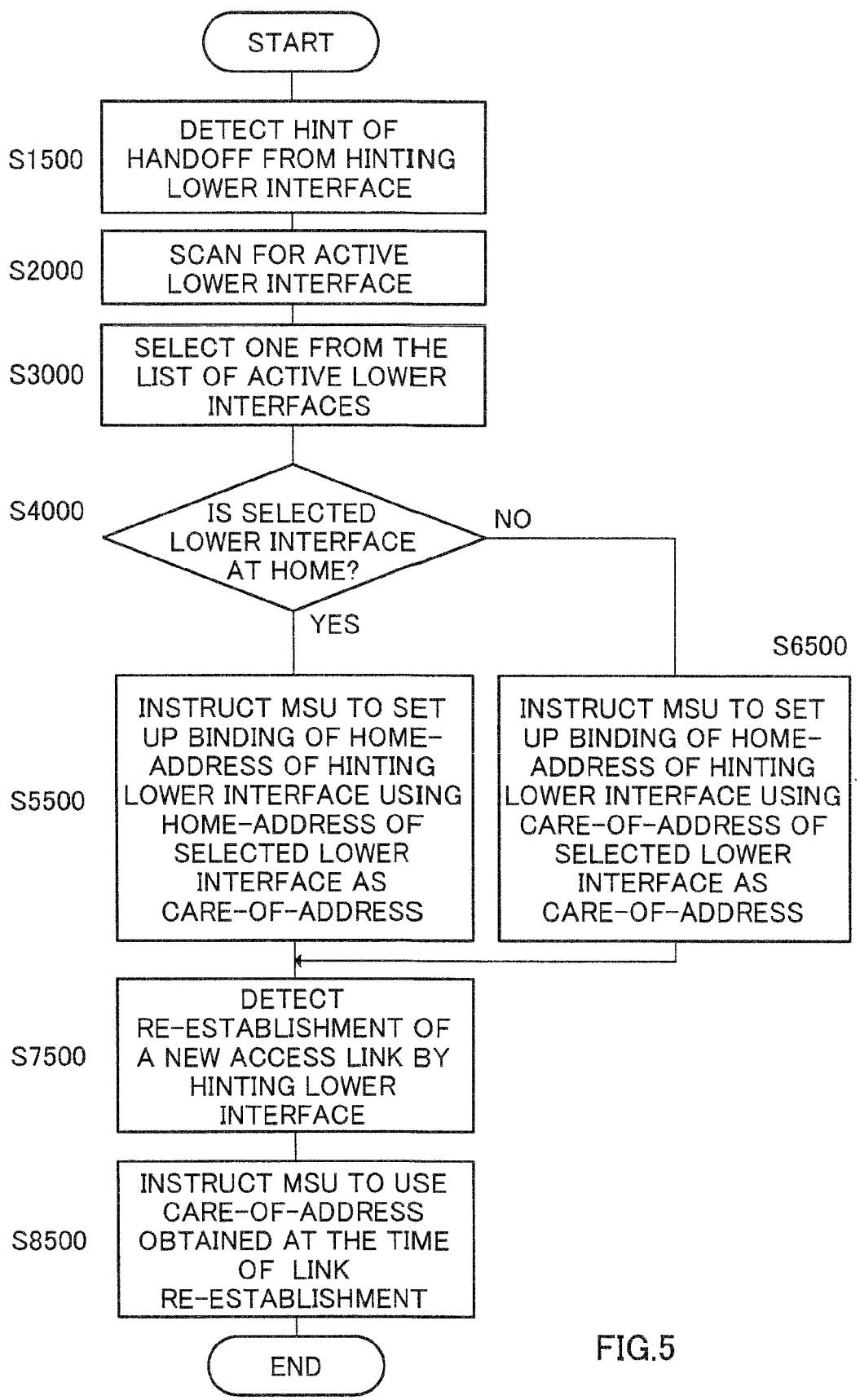
FIG. 5 is a flow chart for explaining operations of multiple access decision unit in the mobile terminal according to Embodiment 2 of the present invention.

As shown in FIG. 5, the steps taken by MADU 202 are similar to those depicted in FIG. 3.

FIG. 5 is a flow chart for explaining the operations in MADU 202.

In step 1500, MADU 202 receives Interface_Release_Indicator_Message as a hint of handoff from the hinting lower interface, for example, lower interface 201-*a* (equivalent to lower interface 101-*a*). Then, MADU 202 proceeds to step 2000, and the operations of steps 2000 to 4000 will be performed as explained in Embodiment 1.

As a result of the check in step 4000, if the selected lower interface, for example, lower interface 201-*b* (equivalent to lower interface 101-*b*) is at home, MADU 202 instructs MSU 102 to set up a binding of the home-address of the hinting lower interface 201-*a* with the home-address of the selected lower interface 201-*b* as the care-of-address, in step 5500. On the other hand, if the selected lower interface 201-*b* is in a foreign domain, MADU 202 instructs MSU 102 to set up a binding of the home-address of the hinting lower interface 201-*a* with the care-of-address of the selected lower interface 201-*b* as the care-of-address, in step 6500.

Similar to the case in Embodiment 1 for a downed lower interface, MADU 202 will need to set some internal state to reflect that the hinting lower interface 201-*a* is in a state where the care-of-address is "borrowed" from another lower interface 201-*b*. In addition, MADU 202 will also need to remember from which lower interface 201 the hinting lower interface 201-*a* "borrowed" the care-of-address. Doing so allows MADU 202 to take appropriate actions when one lower interface 201 having its address borrowed by another lower interface 201 goes down or gives notifications of a predicted loss of connectivity. When this happens, MADU 202 scans through its internal states to see which lower interfaces 201 have "borrowed" their care-of-addresses from lower interface 201 that has gone down (or given notification on a predicted loss of connectivity). Any lower interfaces 201 that have "borrowed" are treated as going down too, and the algorithm that is described in FIG. 4 must be carried out for every one of them.

The new address binding will be in effect until such a time when the hinting lower interface 201-*a* reestablishes a new access link, in step 7500. In the present embodiment, the hinting lower interface 201-*a* may reestablish a new access link after going down or without going down.

Then, MADU 202 will instruct MSU 102 to use the new care-of-address obtained from the base station (original or new) for the binding of the home-address of the hinting lower interface, that is, HoA.1, in step 8500. In addition, MADU 202 will remove any state variable associated with the hinting lower interface 201-*a*, so that the lower interface 201-*a* is no longer marked as having "borrowed" a care-of-address.

According to the present embodiment, handoff prediction is performed. Performing such handoff prediction is advantageous because although a new address binding is established, the actual physical link between lower interface 201 and the base station is still up. Thus any packet that is already in transit can still reach mobile terminal 200 at the previous care-of-address. This allows for seamless handoff between two base stations.

Figure 6:
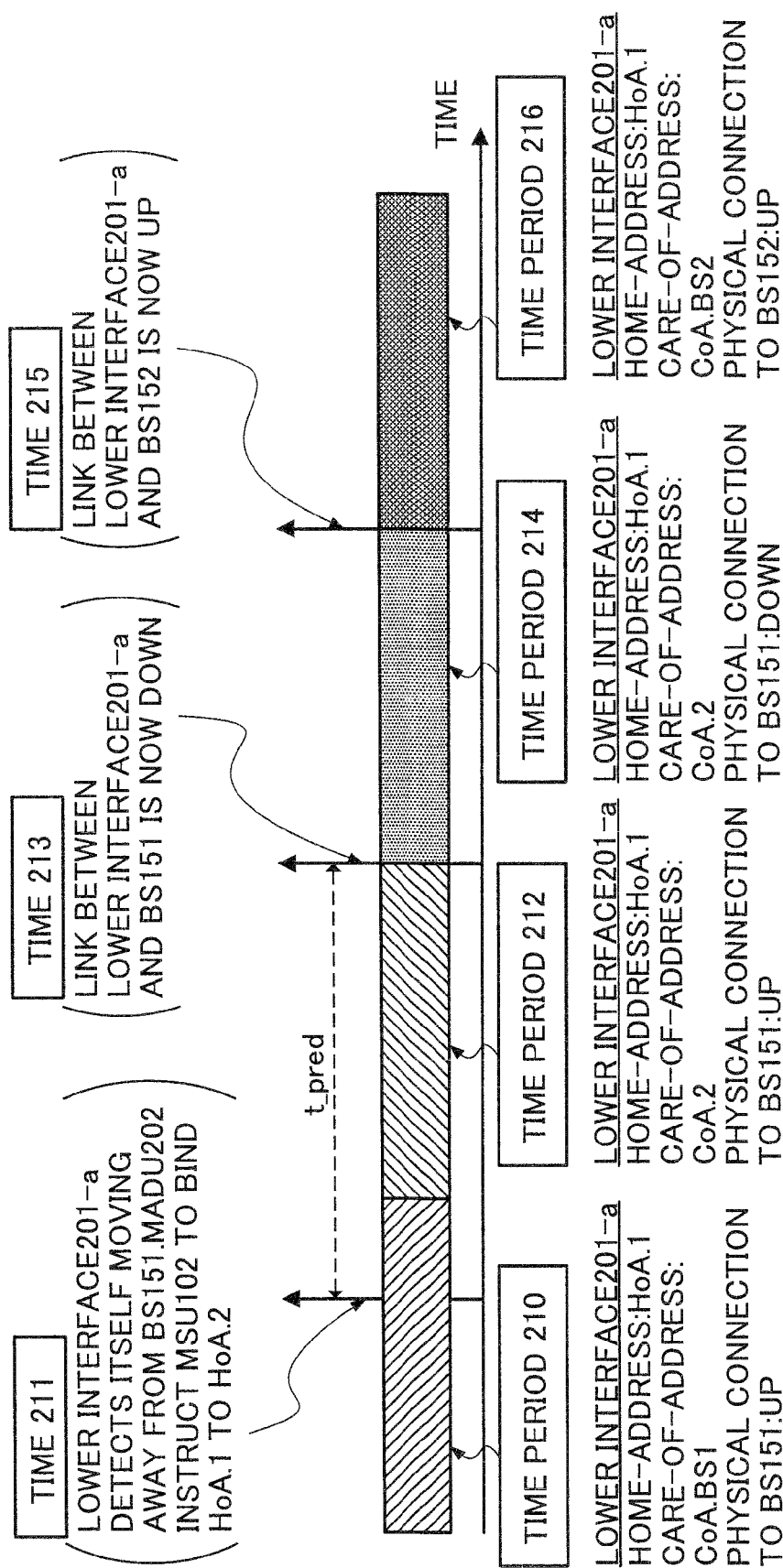
FIG. 6 is a drawing showing a timeline of a lower interface being handed off between base stations in Embodiment 2.

As an illustration, FIG. 6 shows the timeline of lower interface 201-*a* being handed off from an old base station, for example, base station (BS) 151, to a new base station, for example, base station (BS) 152. In time period 210, the link between lower interface 201-*a* and BS151 is active, and the home-address of lower interface 201-*a*, HoA.1, is bound to the care-of-address, CoA.BS1, which is topologically compatible to the domain of BS151.

At time 211, lower interface 201-*a* detects that it is moving away from BS151, and alerts MADU 202. MADU 202 then follows the algorithm as above-explained with FIG. 5, and selects the care-of-address, CoA.2, of alternative lower interface 201. This address is then bound to the home-address HoA.1 by sending to other nodes (for example, the home-agent of mobile terminal 200) binding update messages conveying this new binding.

Thus in time period 212, lower interface 201-*a* will start using the new (temporary) care-of-address of CoA.2. Note that in this time period 212, lower interface 201-*a* can still be reached by BS151, and thus any packets sent to mobile terminal 200 addressed to CoA.BS1 will still be able to be delivered to mobile terminal 200.

At time 213, mobile terminal 200 has moved so far away from BS151 such that the link between BS151 and lower interface 201-*a* is down. Hence, in time period 214, lower interface 201-*a* can no longer receive packets that are still addressed to CoA.BS1. Finally, at the time 215, lower interface 201-*a* is associated with a new base station, that is, BS152. Lower interface 201-*a* is then assigned a new care-of-address CoA.BS2, that is topologically compatible within the domain of BS152. Hence in time period 216, the home-address HoA.1 is bound to the care-of-address CoA.BS2. Note that as long as lower interface 201 from which CoA.2 is "borrowed" is active, packets addressed to CoA.2 can still be received by mobile terminal 200.

As is evident from the above description, the present embodiment allows mobile terminal 200 to be reached at all times by its home-address(es), provided that at least one lower interface is active at any given time. The present embodiment also solves the problem that packets that are forwarded to a previous care-of-address after a handoff cannot be received, without requiring special operations of the base station.

On careful inspection of the timeline illustrated in FIG. 6, there is a slight possibility that a packet forwarded to mobile terminal 200 at the care-of-address CoA.BS1 may not reach mobile terminal 200. This will happen if the packet arrives at BS151 after lower interface 201-*a* is disconnected from BS151 (i.e. after time 213). To avoid this, the length of time period 212 (i.e. the time length t_pred) must be long enough so that the packet sent by all other nodes, which still think the home-address HoA.1 is bound to the care-of-address CoA.BS1, have been delivered before time 213.

Note that this has two parts to it: first, the sending node may in fact know the binding of HoA.1 and CoA.BS1; and second, the sending node sends the packet to HoA.1, and the home agent for lower interface 201-*a* tunnels the packet to CoA.BS1. Hence, the time length t_pred must be long enough so that the binding update message containing the new binding of HoA.1 and CoA.2 has sufficient time to reach all nodes that know the binding of HoA.1 and CoA.BS1, plus the additional transit time for any packets sent by these nodes to reach BS151. Mathematically, to ensure a truly seamless handoff, the time length t_pred meets the conditions of the following equation (Eq 1):

$$t\_pred >= t\_bu + t\_pkt \quad \text{(Eq 1)}$$

where: t_pred is the time after lower interface 201-*a* predicts a break in connection and the time when the break in connection really occurs; t_bu is the mean time binding update messages sent by mobile terminal 200 take to reach their intended recipients; and t_pkt is the mean time packets sent by any other nodes take to reach mobile terminal 200. Note that doing so can only minimize loss of packets due to handoff, since in a typical packet-switched data communications network (such as IP or IPv6) the transit time of a packet is unbounded. Normally, t_bu and t_pkt are difficult to estimate. Thus often practiced in the field is to estimate their sum, also known as the round trip time, t_rtt, which gives the mean time packets take to travel from mobile terminal 200 to another node and return. Thus the above (Eq 1) becomes the following equation (Eq 2):

$$t\_pred >= t\_rtt \quad \text{(Eq 2)}$$

Accordingly, such apparatus as mobile terminal 200 that employs handoff prediction can borrow a temporary address in advance, thus achieving a truly seamless handoff, without requiring special considerations on the operations of the base stations.

Embodiment 3

Figure 7:
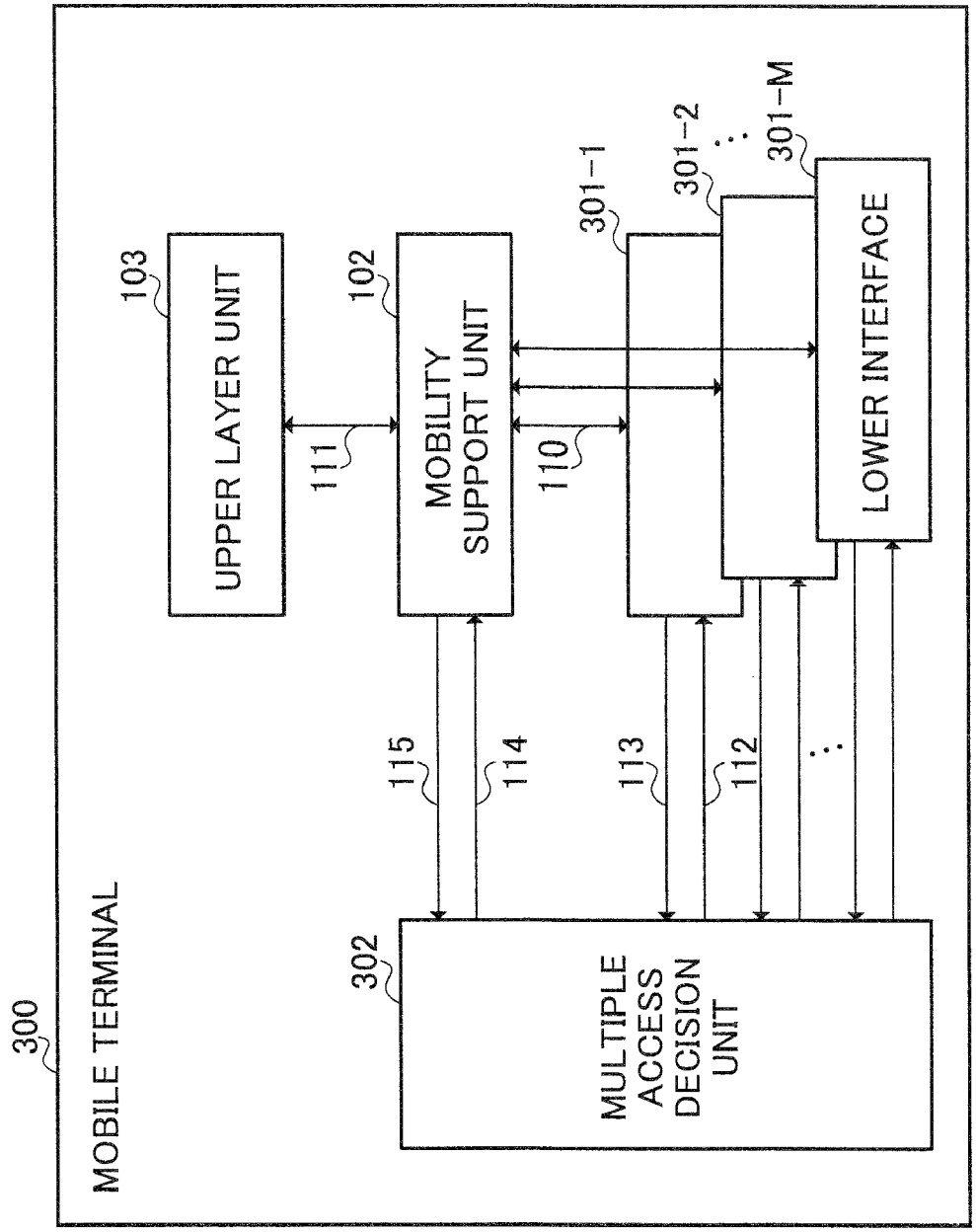
FIG. 7 is a block diagram showing the architecture of a mobile terminal according to Embodiment 3 of the present invention.

FIG. 7 is a block diagram showing the architecture of a mobile terminal according to Embodiment 3 of the present invention. Mobile terminal 300 shown in FIG. 7 has a basic architecture similar to that of mobile terminal explained in Embodiment 1, and therefore the elements of mobile terminal 300 that are identical to those of mobile terminal 100 will be given identical reference numerals, and detailed description thereof will be omitted.

Mobile terminal 300 has M number of lower interfaces 301-1 to 301-M and MADU 302 instead of lower interfaces 101-1 to 101-M and MADU 104 of mobile terminal 100. Hereinafter, when reference is made to one or more of lower interfaces 301-1 to 301-M, the lower interface(s) will be referred to as "lower interface 301."

The above-described embodiments disclosed methods whereby mobile terminals 100 and 200 can achieve seamless handoff with a plurality of active access links. In addition, in the present embodiment, it can be extended so that mobile terminal 300 needs only to have one access mechanism active at any given time under normal circumstances. Only when the active access mechanism loses its connection to the base station, then MADU 302 is kicked in to activate an alternative access mechanism.

This kind of "on-demand" activation is especially useful when a mobile terminal has two different types of access mechanisms: one that is cheap (or fast) but provides only short range access (e.g. IEEE 802.11 or BLUETOOTH) and one that is expensive (or slow) but provides long range access (for example, GPRS or satellite link). Under normal situation, mobile terminal 300 will want to use the cheaper (or faster) access mechanism as the primary access method. However, when mobile terminal 300 goes out of range, it can then fire up the more expensive (or slower) access mechanism to maintain connectivity, until mobile terminal 300 reaches a new operation area of the primary access mechanism.

Accordingly, lower interfaces 301-1 to 301-M are associated with different types of access mechanisms. Any other features of lower interfaces 301-1 to 301-M are the same as lower interfaces 101-1 to 101-M of mobile terminal 100.

Also, as stated above, MADU 302 activates and deactivates an alternative access mechanism when it learns that an access mechanism loses its connection to the base station. Any other features of MADU 302 are the same as MADU 104 of mobile terminal 100.

Figure 8:
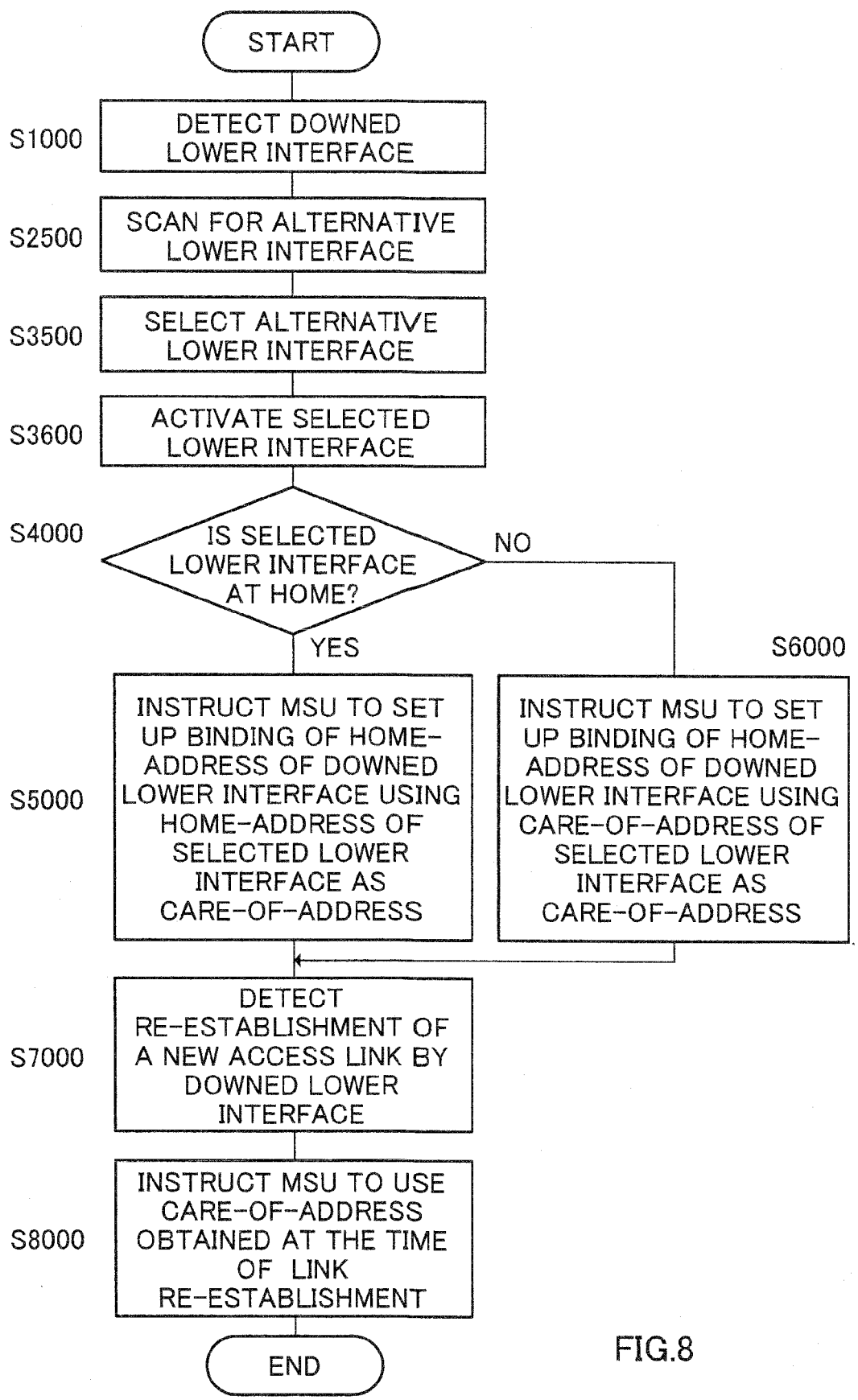
FIG. 8 is a flow chart for explaining operations of multiple access decision unit in the mobile terminal according to Embodiment 3 of the present invention.

Next, the operations in MADU 302 of mobile terminal 300 having the above architecture will be explained using FIG. 8. MADU 302 follows the algorithm depicted in FIG. 8.

After detecting in step 1000 a downed lower interface, for example lower interface 301-a (equivalent to lower interface 101-a), MADU 302 scans through lower interfaces 301-1 to 301-M to search for one or more lower interfaces 301 associated with an alternative access mechanism of a different type from the access mechanism associated with the downed lower interface 301-a, in step 2500. Such lower interfaces will be referred to as "alternative lower interfaces" hereinafter.

Then, in step 3500, MADU 302 selects one of alternative lower interfaces 301, for example, lower interface 301-b (equivalent to lower interface 101-b), based on the same selecting method as explained in Embodiment 1.

It then activates the selected alternative lower interface 301-b (i.e. the access mechanism of the selected alternative lower interface 301-b), in step 3600. This includes waiting for the selected alternative lower interface 301-b to power up, associate with a base station, and set up a care-of-address, if necessary. Once the selected alternative lower interface 301-b becomes active, MADU 302 proceeds to step 4000. Then, the operations in steps 4000 to 8000 will be performed. These steps are identical to those found in FIG. 3 and are explained in Embodiment 1.

Thus, according to the present embodiment, mobile terminal 300 and a method thereof are provided that can activate an alternative access mechanism on demand to ensure that a temporary address can be used.

Deployment of the technology described in the present embodiment can typically be found in an internet protocol (IP) environment. Here a mobile terminal, such as a personal digital assistant (PDA), may have two different access interfaces: one that is slower but has longer range using GPRS (General Packet Radio Service); and the other one that is faster but has shorter range using the Institute of Electrical and Electronics Engineers (IEEE) 802.11b standard.

The mobile terminal can subscribe to a single internet service provider (ISP) and use both mechanisms. In this case, the ISP is most likely to provide a single home agent to manage both access interfaces. Alternatively, the mobile terminal can subscribe to separate ISP's for different access interfaces. In this case, each ISP will provide one home agent to manage each access interface. Using the method described in the present embodiment, the mobile terminal can use 802.11b to access the Internet while in the operating range of an 802.11b access point, which can be found in hotspots that are gaining popularity. When the mobile terminal moves out of the range, the longer range GPRS can be used to provide temporary access to the Internet, until the mobile terminal moves within the range of another 802.11b access point. Note that it is immaterial to the present invention if a single ISP (therefore a single home agent) or multiple ISP's (thus a plurality of home agents) are involved.

Thus, the technology disclosed in the present embodiment will work seamlessly. Also, the mobile terminal can employ route optimization techniques to send binding updates to nodes other than its home agent(s). The method of the present embodiment will allow the mobile terminal to maintain session continuity across successive handoffs as long as the mobile terminal made known the bindings of addresses to every node that is necessary.

Embodiment 4

Figure 9:
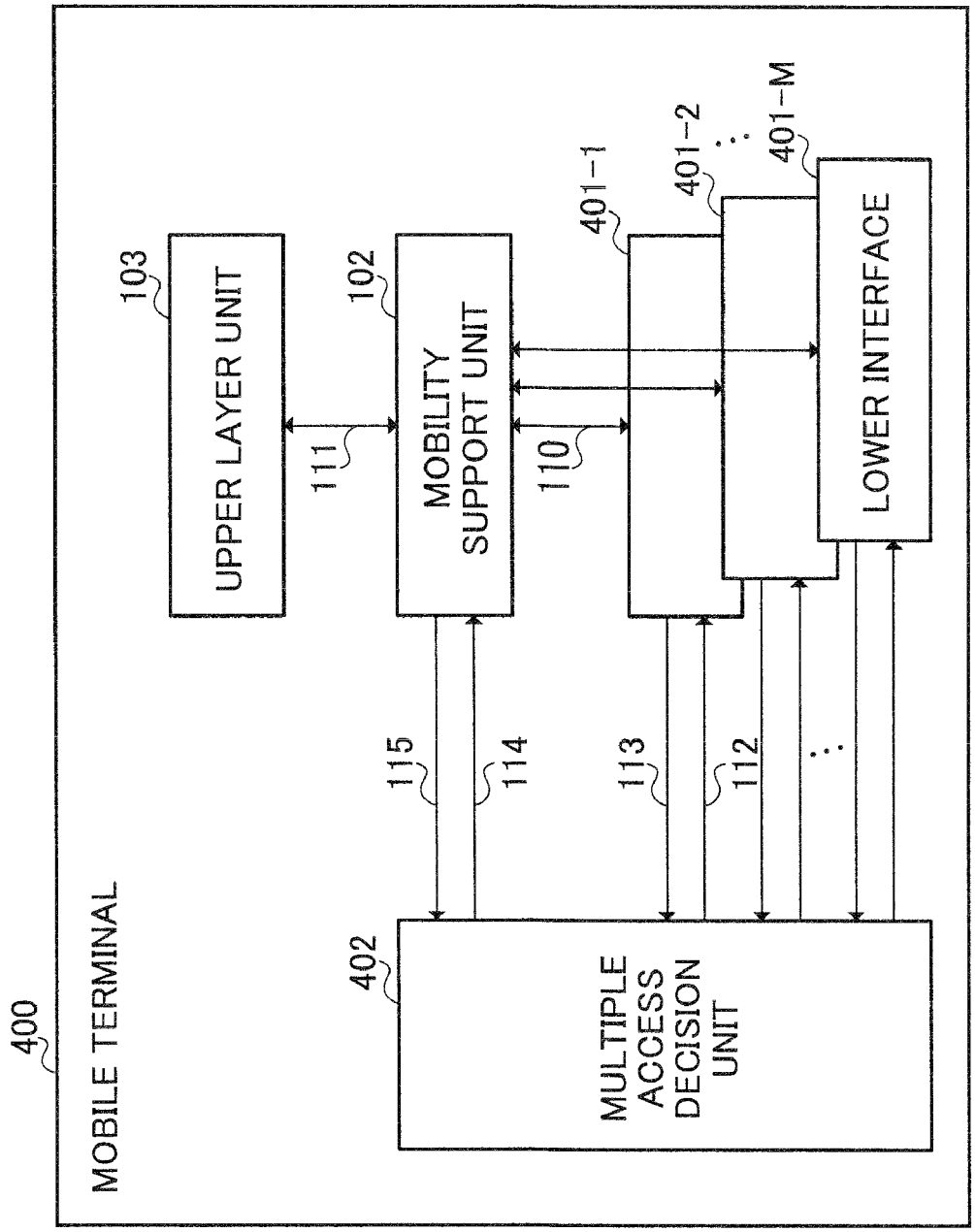
FIG. 9 is a block diagram showing the architecture of a mobile terminal according to Embodiment 4 of the present invention.

FIG. 9 is a block diagram showing the architecture of a mobile terminal according to Embodiment 4 of the present invention. Mobile terminal 400 shown in FIG. 9 has a basic architecture similar to that of mobile terminal explained in Embodiment 1, and therefore the elements of mobile terminal 400 that are identical to those of mobile terminal 100 will be given identical reference numerals, and detailed description thereof will be omitted.

Mobile terminal 400 has M number of lower interfaces 401-1 to 401-M and MADU 402, instead of lower interfaces 101-1 to 101-M and MADU 104 of mobile terminal 100. Hereinafter, when reference is made to one or more of lower interfaces 401-1 to 401-M, the lower interface(s) will be referred to as "lower interface 401."

For better understanding of the present embodiment, the technical feature in the present embodiment is a combination of the prediction techniques explained in Embodiment 2 and the "on-demand" activation techniques explained in Embodiment 3. It is possible to further enhance the effects provided by the apparatus and method explained in Embodiment 3 with the prediction techniques described earlier.

Accordingly, lower interfaces 401-1 to 401-M, like lower interfaces 301-1 to 301-M, are associated with different types of access mechanisms. Also, lower interfaces 401-1 to 401-M, like lower interfaces 201-1 to 201-M, conduct handoff prediction. The other features of lower interfaces 401-1 to 401-M are the same as interfaces 101-1 to 101-M explained in Embodiment 1.

Like MADU 302, MADU 402 activates and deactivates an alternative access mechanism when it learns that an access mechanism loses its connection to the base station. Also, when MADU 402, like MADU 202, receives Interface_Release_Indicator_Message via signal path 113 generated by lower interface 401, which indicates that lower interface 401 is about to be disconnected, then MADU 402 takes steps to reassociate the home-address of lower interface 401 that is sending the Interface_Release_Indicator_Message (i.e. the hinting lower interface 401) in advance. The other features of MADU 402 are the same as MADU 104 explained in Embodiment 1.

Figure 10:
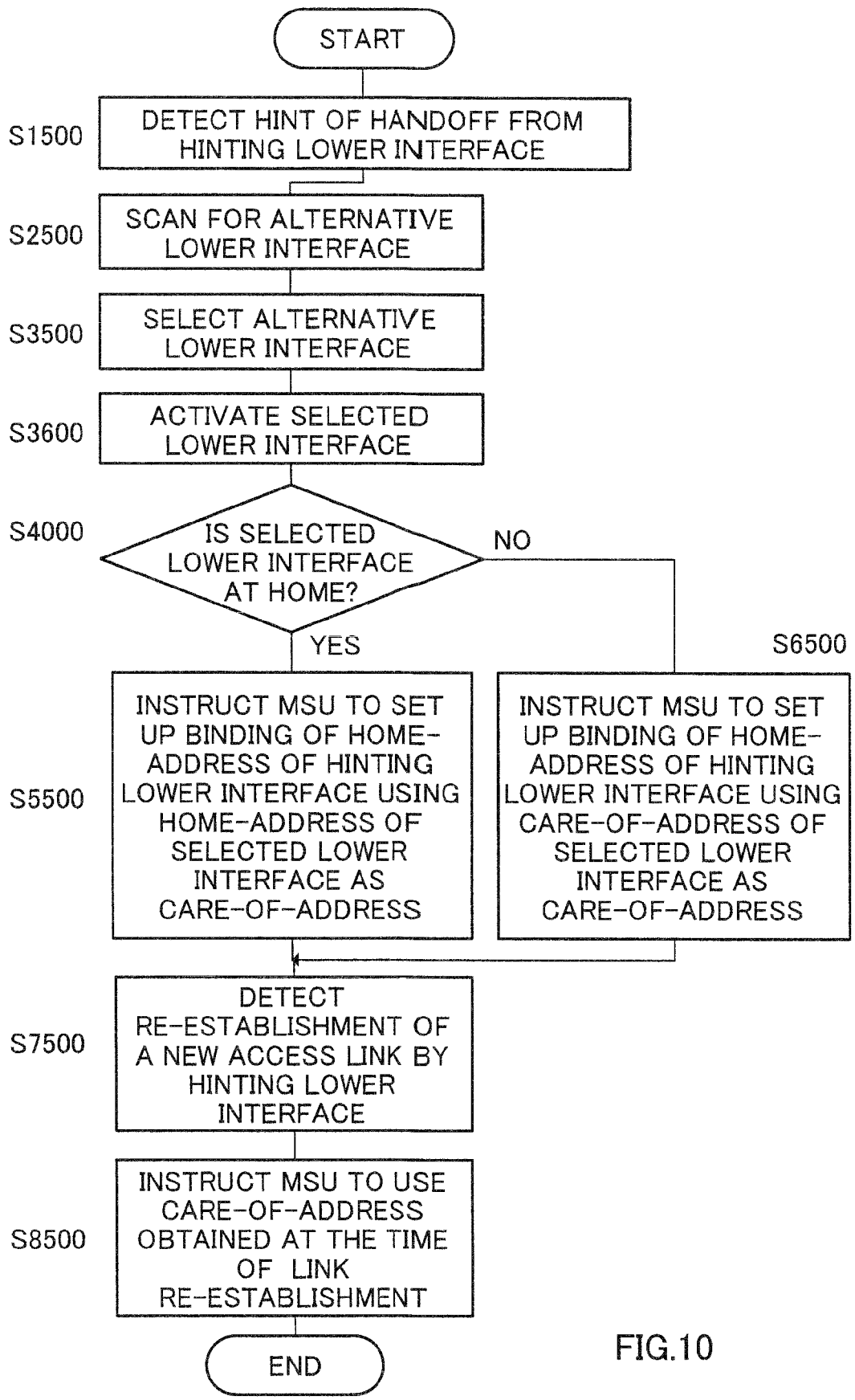
FIG. 10 is a flow chart for explaining operations of multiple access decision unit in the mobile terminal according to Embodiment 4 of the present invention.

Next, the operations in MADU 402 of mobile terminal 400 having the above architecture will be explained using FIG. 10. MADU 402 follows the algorithm depicted in FIG. 10. After step 1500 explained in Embodiment 2, MADU 402 proceeds to step 2500, step 3500, and step 3600 explained in Embodiment 3, then to step 4000 explained in Embodiment 1. Then, step 5500 or step 6500 explained in Embodiment 2 follows, based on the result of the check in step 4000, and then proceeds to step 7500 and step 8500 explained in Embodiment 2.

Combining such on-demand activation with handoff prediction brings additional benefits: not only can mobile terminal 400 achieve seamless handoff for its primary lower interface 401, it can also keep its operating cost low (cost is measured in terms of monetary value, delay in transmission or power consumption, depending on the criterion used when the primary access mechanism was selected) by having alternative lower interface 401 in an off mode until it is needed. As an example, the timeline of a lower interface, for example lower interface 401-*a* (equivalent to lower interface 101-*a*) being handed off from an old base station, for example BS151, to a new base station, for example BS152, is shown in FIG. 11.

In time period 411, the link between lower interface 401-*a* and BS151 is active, and the home-address of lower interface 401-*a*, HoA.1, is bound to the care-of-address, CoA.BS1, which is topologically compatible to the domain of BS151. At time 412, lower interface 401-*a* detects that it is moving away from BS151, and alerts MADU 402. MADU 402 then follows the algorithm depicted in FIG. 10, and selects alternative lower interface 401 to activate. This alternative lower interface 401 is activated at time 413, and is assigned a care-of-address CoA.2. MADU 402 then instructs MSU 102 to set up a binding between HoA.1 and CoA.2 by sending to other nodes (such as the home-agent of mobile terminal 400) binding update messages conveying this new binding. Thus in the time period 414, lower interface 401-*a* will start using the new (temporary) care-of-address CoA.2. Note that in time period 414, lower interface 401-*a* can still be reached by BS151, thus any packets sent to mobile terminal 400 addressed to CoA.BS1 will still be able to be delivered to mobile terminal 400.

At the time 415, mobile terminal 400 has moved so far away from BS151 that the link between BS151 and lower interface 401-*a* is down. Hence, in the time period 416, lower interface 401-*a* can no longer receive packets that are still addressed to CoA.BS1. Subsequently, mobile terminal 400 moves within range of BS152 at the time 417. Lower interface 401-*a* is then assigned a new care-of-address CoA.BS2, that is topologically compatible within the domain of BS152. Hence in the time period 418, the home-address HoA.1 is bound to the care-of-address CoA.BS2. Note that as long as the alternative lower interface 401, from which CoA.2 is "borrowed," is active, packets addressed to CoA.2 can be received by mobile terminal 400. Thus, the alternative lower interface 401 is only shut off after some delay, t_delay, at time 419, to allow the delivery of all remaining packets that are forwarded to CoA.2.

Figure 11:
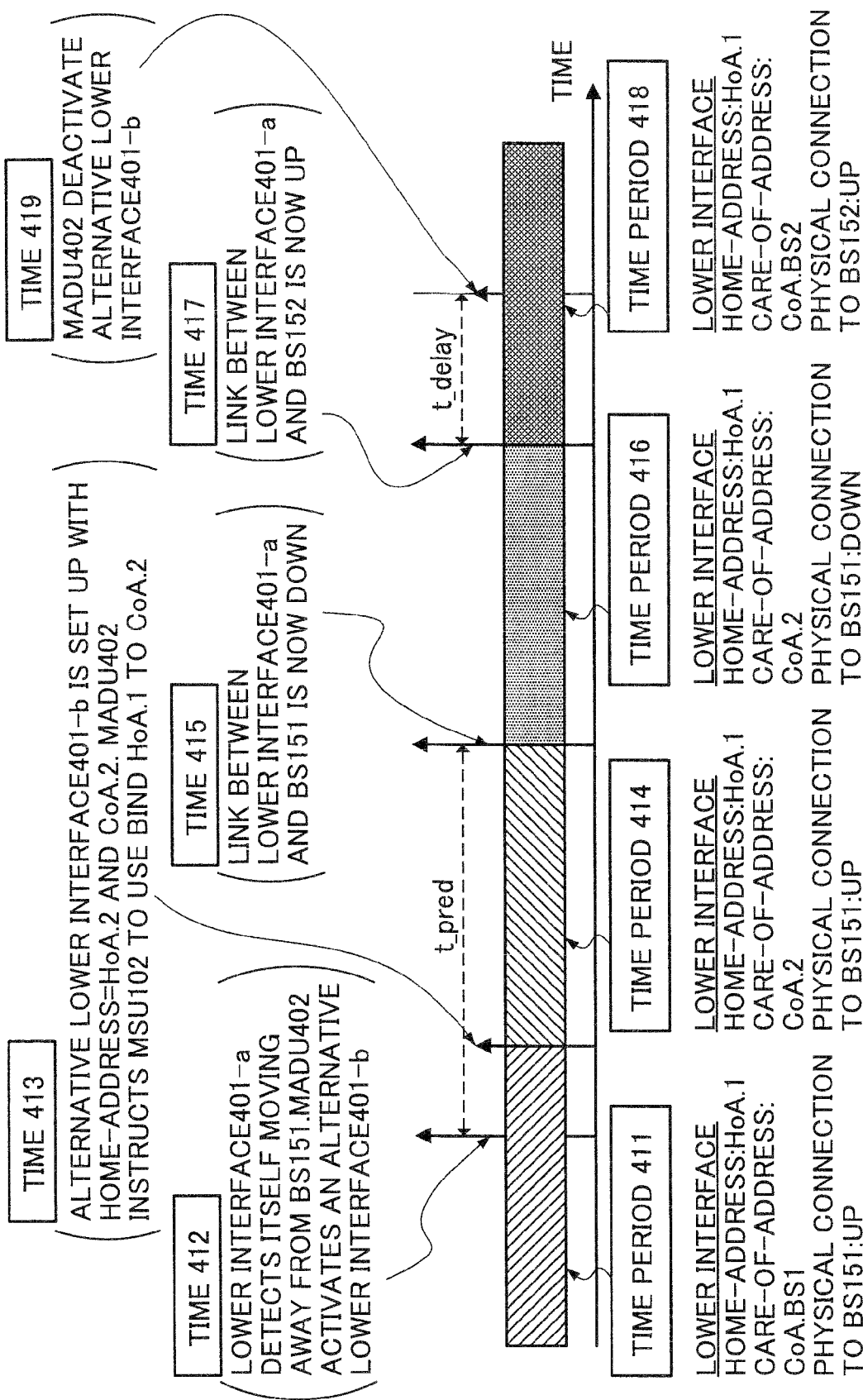
FIG. 11 is a drawing showing a timeline of a lower interface being handed off between base stations in Embodiment 4.

There are two time lengths that are important to ensure truly seamless handoff, t_pred and t_delay, shown in FIG. 11. The time length t_pred is the time after lower interface 401-*a* predicts a break in connection until the time when the break in connection really occurs. To minimize loss of packets due to handoff, the time length t_pred must be greater than or equal to the sum of:
(i) Time it takes to activate alternative lower interface 401;
(ii) Time alternative lower interface 401 takes to set up an address binding if it is in a foreign domain;
(iii) Mean time binding update messages take to reach their intended recipients; and
(iv) Mean time packets sent by other nodes take to reach mobile terminal 400.

Mathematically, this implies the following equation (Eq 3):

$$t\_pred >= t\_activate + t\_bu + t\_pkt \quad (Eq\ 3)$$

where: t_pred is the time after lower interface 401-*a* predicts a break in connection until the time when the break in connection really occurs; t_activate is the time it takes to activate alternative lower interface 401, including the time alternative lower interface 401 takes to set up an address binding if it is in a foreign domain; t_bu is the mean time binding update messages sent by mobile terminal 400 take to reach their intended recipients; and t_pkt is the mean time packet sent by any other nodes take to reach mobile terminal 400. If the round trip time, t_rtt, is estimated instead of t_bu and t_pkt, the above equation (Eq 2) becomes the following equation (Eq 4):

$$t\_pred >= t\_activate + t\_rtt \quad (Eq\ 4)$$

The time length t_delay is the delay after the downed lower interface 401-*a* associates with BS152 before shutting down the alternative lower interface 401. To minimize loss of packets due to handoff, the time length t_delay must be greater than or equal to the sum of the mean time binding update messages take to reach their intended recipients and the mean time packets sent by other nodes take to reach mobile terminal 400.

Mathematically, this means the following equation (Eq 5):

$$t\_delay >= t\_bu + t\_pkt \quad (Eq\ 5)$$

Alternatively, if the round trip time, t_rtt, is used, the above equation (Eq 5) becomes the following equation (Eq 6):

$$t\_delay >= t\_rtt \quad (Eq\ 6)$$

Accordingly, such apparatus as mobile terminal 400 that employs handoff prediction can borrow a temporary address in advance, thus achieving a truly seamless handoff, without requiring special considerations on the operations of the base stations.

As described above, a mobile terminal apparatus according to one aspect of the present invention has: a plurality of interfaces, each interface being capable of, when an associated access mechanism is in an active state, obtaining a connection to a network using one of a home-address which is assigned to the interface in advance and a care-of-address which is assigned to the interface while the interface is in a domain where the home-address is not available; an instructing section that instructs a setup of a binding of a home-address of a first interface of the plurality of interfaces, the first interface losing a connection obtained through a care-of-address of the first interface, and one of a home-address and a care-of-address of a second interface, of the plurality of interfaces; and a setup section that sets up the binding.

With this configuration, an instruction is provided to set up a binding between a home address of a first interface among a plurality of interfaces, the first interface losing a connection obtained through a care-of-address assigned to the first interface, and one of a home address and a care-of-address of a second interface among the same plurality of interfaces, and the binging is thus set up. Even if a mobile terminal moves and its point of attachment to a packet-switched data communications network changes, the mobile terminal is still able to execute high speed handoff procedures using its own resources alone, thereby enabling smooth, continuous communications sessions in the packet-switched data communications network even when in transit, regardless of base station capabilities and functionalities. By changing the access mechanism (for example, access technique), the mobile terminal is able to perform a smooth handoff in high speed handoff procedures, without actively involving base stations. By this means, the mobile terminal is able to completely control the handoff procedures and reduce the amount of processing in the base stations. In addition, since the handoff procedures are performed by the mobile terminal alone and do not depend on base stations' capabilities.

In addition, a handoff method according to another aspect of the present invention is for use in a mobile terminal apparatus having a plurality of interfaces, each interface being capable of, when an associated access mechanism is in an active state, obtaining a connection to a network using one of a home-address which is assigned to the interface in advance and a care-of-address which is assigned to the interface while the interface is in a domain where the home-address is not available, includes: an instructing step for instructing a setup of a binding of a home-address of a first interface, the first interface losing a connection obtained through a care-of-address of the first interface, and one of the plurality of interfaces, and one of a home-address and a care-of-address of a second interface of the plurality of interfaces; and a setup step for setting up the binding.

With this method, an instruction is provided to set up a binding between a home address of a first interface among a plurality of interfaces, the first interface losing a connection obtained through a care-of-address assigned to the first interface, and one of a home address and a care-of-address of a second interface among the same plurality of interfaces, and the binging is thus set up. Even if a mobile terminal moves and its point of attachment to a packet-switched data communications network changes, the mobile terminal is still able to execute high speed handoff procedures using its own resources alone, thereby enabling smooth, continuous communications sessions in the packet-switched data communications network even when in transit, regardless of base station capabilities and functionalities. By changing the access mechanism (for example, access technique), the mobile terminal is able to perform a smooth handoff in high speed handoff procedures, without actively involving base stations. By this means, the mobile terminal is able to completely control the handoff procedures and reduce the amount of processing in the base stations. In addition, since the handoff procedures are performed by the mobile terminal alone and do not depend on base stations' capabilities.

The present application is based on Japanese Patent Application No. 2003-171295, filed on Jun. 16, 2003, the entire content of which is expressly incorporated herein by reference.

INDUSTRIAL APPLICABILITY

The mobile terminal apparatus and the handoff method of the present invention have an advantage of enabling smooth, continuous communications sessions even when in transit, regardless of base station capabilities and functionalities, and are useful for constantly changing points of attachment to a packet-switched data communications network.

What is claimed is:

1. A mobile terminal apparatus comprising:
a plurality of interfaces, each interface being configured to, when an associated access mechanism thereof is in an active state, obtain a connection to a network using one of a home-address and a care-of-address, said home-address being assigned to said interface in advance, said care-of-address being assigned to said interface while said interface is in a domain where the home-address is not available;
an instructing section that instructs a setup of a binding of a home-address of a first interface of said plurality of interfaces and one of a home-address and a care-of-address of a second interface of said plurality of interfaces when said first interface loses a connection obtained through a care-of-address of said first interface, and stores information on a state in which the home address of the first interface is set to be bound to one of the home-address and the care-of-address of the second interface after instructing the setup of said binding; and
a setup section that sets up the binding, wherein:
when the second interface loses a connection to the network after the setup of said binding is instructed, said instructing section determines an occurrence of the connection loss of the first interface based on the stored information on the state.

2. The mobile terminal apparatus according to claim 1, wherein: when the second interface loses the connection to the network after the setup of said binding is instructed, said instructing section subsequently instructs a second setup of a binding of the home-address of the first interface and one of a home-address and a care-of address of a third interface of said plurality of interfaces, and a third setup of a binding of the home-address of the second interface and one of the home-address and the care-of address of the third interface.

* * * * *

UNITED STATES PATENT AND TRADEMARK OFFICE
CERTIFICATE OF CORRECTION

PATENT NO. : 8,134,973 B2
APPLICATION NO. : 12/345371
DATED : March 13, 2012
INVENTOR(S) : Chan Wah Ng et al.

Page 1 of 1

It is certified that error appears in the above-identified patent and that said Letters Patent is hereby corrected as shown below:

Title page of the Letters Patent issued on March 13, 2012, incorrectly omits Item (86), PCT Application Data.

Item (86), PCT Application Data, should read:

"PCT/JP2004/008796...............June 16, 2004"

Signed and Sealed this
Third Day of July, 2012

David J. Kappos
*Director of the United States Patent and Trademark Office*